(12) United States Patent
Wong et al.

(10) Patent No.: US 10,819,615 B2
(45) Date of Patent: Oct. 27, 2020

(54) NETWORK BRIDGING DEVICE, BUS TEST METHOD AND SYSTEM THEREOF

(71) Applicant: PEGATRON CORPORATION, Taipei (TW)

(72) Inventors: Cyuan-Cheng Wong, Taipei (TW); Shun-I You, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 16/183,356

(22) Filed: Nov. 7, 2018

(65) Prior Publication Data

US 2019/0140934 A1 May 9, 2019

(30) Foreign Application Priority Data

Nov. 7, 2017 (TW) .............................. 106138484 A

(51) Int. Cl.
| | |
|---|---|
| *H04L 12/26* | (2006.01) |
| *H04L 12/46* | (2006.01) |
| *H04L 12/721* | (2013.01) |
| *H04L 12/937* | (2013.01) |

(52) U.S. Cl.
CPC .............. *H04L 43/50* (2013.01); *H04L 12/46* (2013.01); *H04L 12/4625* (2013.01); *H04L 43/0864* (2013.01); *H04L 43/0888* (2013.01); *H04L 45/66* (2013.01); *H04L 49/253* (2013.01)

(58) Field of Classification Search
None
See application file for complete search history.

(56) References Cited

U.S. PATENT DOCUMENTS

| | | | |
|---|---|---|---|
| 9,686,002 B1 * | 6/2017 | Schelstraete | H04B 7/0452 |
| 10,009,263 B1 * | 6/2018 | Sufleta | H04L 45/74 |
| 2008/0195831 A1 * | 8/2008 | Tsukamoto | G06F 3/0611 |
| | | | 711/167 |
| 2009/0003317 A1 * | 1/2009 | Kasralikar | H04L 63/1408 |
| | | | 370/352 |
| 2017/0353366 A1 * | 12/2017 | Nasgowitz | H04L 43/045 |
| 2018/0062987 A1 * | 3/2018 | Badillo | H04L 45/66 |

\* cited by examiner

*Primary Examiner* — Kodzovi Acolatse
*Assistant Examiner* — The Hy Nguyen
(74) *Attorney, Agent, or Firm* — Muncy, Geissler, Olds & Lowe, P.C.

(57) ABSTRACT

A network bridging device, a bus test method and a system thereof are disclosed. The method comprises the steps of: receiving a packet signal via a first network port, wherein the packet signal is specified to be transmitted to a second network connection device; turning off a MAC learning function of a network switching module; setting a port isolation function of the network switching module to isolate a connection between the first network port and a second network port, such that the packet signal is transmitted to a processing module; controlling the processing module to enable a remote loopback function of a media access control port to cause the processing module to return the packet signal to the second network connection device so as to acquire a throughput of a bus.

11 Claims, 3 Drawing Sheets

NETWORK BRIDGING DEVICE, BUS TEST METHOD AND SYSTEM THEREOF

BACKGROUND

1. Technology Field

The present disclosure relates to a network bridging device, a bus test method and a system thereof; more particularly, the present disclosure relates to a network bridging device, a bus test method and a system thereof capable of completing a test without going through WiFi transmission.

2. Description of the Related Art

In known prior arts, if there is a need of testing a throughput of a bus, a common practice is to transmit packets between two computers, wherein the path of packet transmission must pass through this bus. Currently, in a general WiFi AP network bridging device, an internal processing module and switch chip are usually connected by a bus, such as a Reduced Gigabit Media Independent Interface (RGMII) bus. However, if a throughput test is performed directly by two computers to a RGMII bus of a general network bridging device, it would be limited by the internal restriction of the network bridging device, and thus packets of the computers would only be transmitted between two ports without passing through the RGMII bus, which would result in failure of testing the RGMII bus.

Next, please refer to FIG. 1, which illustrates a structural schematic drawing of a bus test system according to a prior art. In the prior art, in order to test a RGMII bus 931 of a network bridging device 90, packets need to be transmitted through the RGMII bus 931. Conventionally, a first computer 951 is connected to a first port 911, and a second computer 952 is connected to a WiFi network with its transmission capacity exceeding the maximum bandwidth, such as 11AC 1300 Mbps, of the RGMII bus 931. As such, the transmission path of packet signals would be from the first computer 951 to the first port 911, then to the switch chip 91, then to a second port 912, then to the RGMII bus 931, then to a media access control port 921, then to a processing module 92, then to a PCIe bus 932, then to a 5G WiFi chip 94, and finally to the second computer 952. This path can complete the throughput test of the RGMII bus 931 so as to obtain the throughput data of the RGMII bus 931.

However, in the test method of the prior art, the path of transmitting the packets would pass through wireless transmission, which is prone to interference, and therefore the test result of the throughput might result in a bigger difference. Further, in the test method of the prior art, an additional WiFi apparatus would be required, wherein the complexity of establishing a WiFi test environment is higher than that of simply using Ethernet; meanwhile, the test process includes more steps, such as establishing a WiFi connection, scanning a SSID, waiting for confirmation of the connection, confirming whether the data transmission rate of the connection is correct, and etc. All of the abovementioned additional apparatuses and operating steps would increase the cost of establishing a product line environment, cost of training production line staff, as well as time cost of testing on the production line.

Moreover, the maximum data transmission rate of WiFi cannot exceed 10 Gigabit per second, therefore, if 10 Gigabit Ethernet (XGMII Bus) or even more advanced 40 Gigabit Ethernet (XLGMII Bus) and 100 Gigabit Ethernet (CGMII Bus) become the primary trend of network products in the future, the traditional method of using WiFi to help test the throughput of the bus would become impracticable or more difficult.

Therefore, there is a need to provide a network bridging device, a bus test method and a system thereof to mitigate and/or obviate the aforementioned problems.

SUMMARY OF THE DISCLOSURE

It is an object of the present disclosure to provide a bus test method, which can complete a test without going through WiFi transmission.

It is another object of the present disclosure to provide a bus test system for implementing the abovementioned method.

It is yet another object of the present disclosure to provide a network bridging device for implementing the abovementioned method.

To achieve the abovementioned objects, the bus test method of the present disclosure is used in a network bridging device. The method comprises the following steps: receiving a packet signal via a first network port, wherein the packet signal is specified to be transmitted to a second network connection device; turning off a media access control layer learning function of a network switching module, such that the packet signal would not be limited to be transmitted to the second network port only; setting a port isolation function of the network switching module to isolate a connection between the first network port and a second network port, such that the packet signal is transmitted to a processing module via a third network port; controlling the processing module to enable a remote loopback function of a media access control port to cause the processing module to return the packet signal to the network switching module via the media access control port; and transmitting the packet signal to the second network connection device via the second network port so as to acquire a throughput of a bus.

The bus test system of the present disclosure comprises a first network connection device, a second network connection device and a network bridging device. The network bridging device is connected to the first network connection device and the second network connection device. The network bridging device comprises a media access control layer and a network processing device. The media access control layer comprises a first network port, a second network port, a third network port and a network switching module. The first network port is connected to the first network connection device for receiving a packet signal, wherein the packet signal is specified to be transmitted to the second network connection device. The second network port is connected to the second network connection device. The network switching module is connected to the first network port, the second network port and the third network port, and is used for turning off a media access control layer learning function and setting a port isolation function, so as to isolate a connection between the first network port and the second network port, such that the packet signal is transmitted to the third network port. The network processing device comprises a media access control port and a processing module. The media access control port is connected to the third network port via a bus for receiving the packet signal. The processing module is connected to the media access control port, and is used for enabling a remote loopback function of the media access control port to cause the processing module to return the packet signal to the network switching module via the media access control port, such that the packet signal is transmitted to the second network connection device via the second network port so as to acquire a throughput of the bus.

The network switching device of the present disclosure is connected to a first network connection device and a second network connection device. The network bridging device comprises a media access control layer and a network processing device. The media access control layer comprises a first network port, a second network port, a third network port and a network switching module. The first network port is connected to the first network connection device for receiving a packet signal, wherein the packet signal is specified to be transmitted to the second network connection device. The second network port is connected to the second network connection device. The network switching module is connected to the first network port, the second network port and the third network port, and is used for turning off a media access control layer learning function and setting a port isolation function, so as to isolate a connection between the first network port and the second network port, such that the packet signal is transmitted to the third network port. The network processing device comprises a media access control port and a processing module. The media access control port is connected to the third network port via a bus for receiving the packet signal. The processing module is connected to the media access control port, and is used for enabling a remote loopback function of the media access control port to cause the processing module to return the packet signal to the network switching module via the media access control port, such that the packet signal is transmitted to the second network connection device via the second network port so as to acquire a throughput of the bus.

Other objects, advantages, and novel features of the disclosure will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
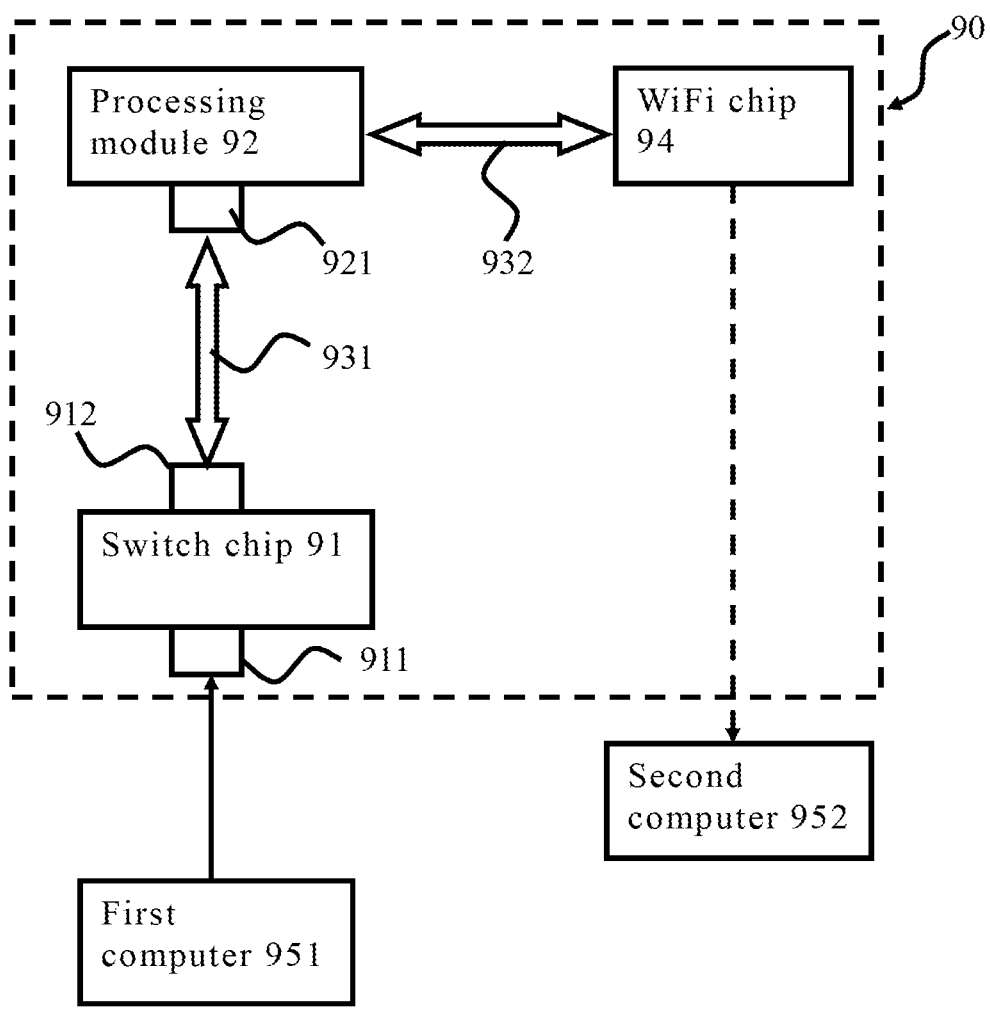
FIG. 1 illustrates a structural schematic drawing of a bus test system according to a prior art.
Figure 2:
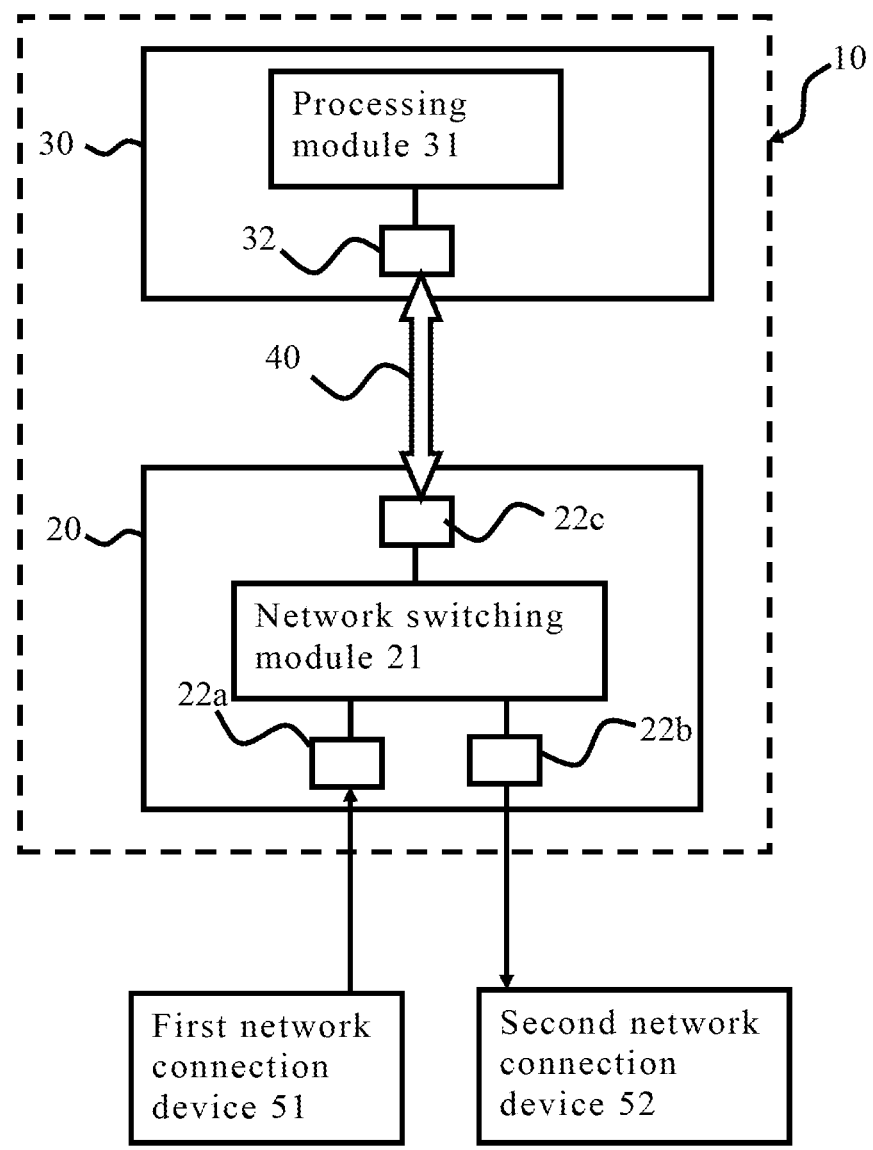
FIG. 2 illustrates a structural schematic drawing of a bus test system according to the present invention.

Please refer to FIG. 2, which illustrates a structural schematic drawing of a bus test system according to the present invention.

In an embodiment of the present invention, the bus test system 1 is used for testing a throughput of a bus 40 of a network bridging device 10. The bus test system 1 comprises a network bridging device 10, a first network connection device 51 and a second network connection device 52. The first network connection device 51 and the second network connection device 52 both utilizes an Ethernet cable to connect to the network bridging device 10. The network bridging device 10 comprises a media access control layer 20, a network processing device 30 network processing device and a bus 40. The bus 40 is used for connecting between the media access control layer 20 and the network processing device 30 for data transmission. In one embodiment of the present invention, the bus 40 can be a RGMII bus or a different type of bus such as MII, RMII, SMII, SSMII, SSSMII, GMII, SGMII, TBI, RTBI, XGMII, XAUI or XLAUI without limiting the scope of the present invention. The first network connection device 51 and the second network connection device 52 can be installed in different computer systems respectively, or installed in the same computer system with their connection established by means of two different network cards, whereas the type of connection in the present invention is not limited to the abovementioned description.

The network bridging device 10 of the present invention can comprise the media access control layer 20 and the network processing device 30. The media access control layer 20 comprises a network switching module 21, a first network port 22a, a second network port 22b and a third network port 22c. The network switching module 21 is connected to the first network port 22a, the second network port 22b and the third network port 22c, and is capable of allocating a packet signal transmitted from the first network port 22a, the second network port 22b or the third network port 22c to be transmitted to a specific port. For example, the network switching module 21 can control the path of the packet signal according to a media access control (MAC) address configured in the packet signal. The first network port 22a is connected to the first network connection device 51, the second network port 22b is connected to the second network connection device 52, and the third network port 22c is connected to the bus 40 and further connected to the network processing device 30. Please note that the number of ports are provided simply for explanation purposes without limiting the scope of the present invention.

In the present invention, upon execution of the test to the bus 40, the first network connection device 51 sends out a packet signal, and specifies the packet signal to be transmitted to the second network connection device 52. Therefore, the first network port 22a would receive this packet signal first. Then, the network switching module 21 is used for turning off a media access control layer learning (MAC learning) function and setting a port isolation function. After the MAC learning function is being turned off, the packet signal would not be directly transmitted to the second network port 22b according to its internally specified address, instead it would be transmitted to the second network port 22b and the third network port 22c at the same time. Meanwhile, the network switching module 21 utilizes the port isolation function to isolate a connection between the first network port 22a and the second network port 22b. As a result, the packet signal transmitted from the first network port 22a would not be transmitted to the second network port 22b, instead it would be transmitted to the remaining third network port 22c.

The network processing device 30 comprises a processing module 31 and a media access control port 32. The processing module 31 is connected to the media access control port 32. The media access control port 32 is connected to the third network port 22c via the bus 40 for receiving the packet signal. At this time, the processing module 31 would enable a remote loopback function of the media access control port 32, such that the packet signal would be returned to the third network port 22c via its original path, which is the media access control port 32 (which is the bus 40). Therefore, the packet signal would be returned to the network switching module 21 of the media access control layer 20 again. At this moment, because the MAC learning function is being turned off, the network switching module 21 would transmit the packet signal to the first network connection device 51 via the first network port 22a and to the second network connection device 52 via the second network port 22b simultaneously. However, because the internally specified address of the packet signal is not specified to the first network connection device 51, the first network connection device 51 would discard the packet signal upon receipt of the packet signal. The second network connection device 52 would receive such packet signal for subsequent processing because it is specified by the internally specified address of the packet signal. Because the transmission of the packet signal between the media access control layer 20 and the network processing device 30 must pass through the bus 40, a throughput of the bus 40 can be obtained accordingly after the second network connection device 52 receives the packet signal. Because the technique of utilizing a received packet signal to acquire the throughput is well known by those skilled in the art, there is no need for further description.

Please note that the network bridging device 10, the first network connection device 51 and the second network connection 52 of the bus test system 1 can be accomplished by hardware devices, software programs combined with hardware devices, or firmware combined with the hardware devices. For example, the network bridging device 10 can achieve the abovementioned MAC learning function, port isolation function and remote loopback function by means of, without limiting the scope of the present invention, utilizing its internal firmware infrastructure or receiving instructions from the first network connection device 51 or the second network connection device 52. Furthermore, embodiments disclosed herein are only preferred embodiments as examples for describing the present invention, in order to avoid redundant expressions, not all possible variations and combinations are described in details in this specification. However, those skilled in the art would understand the above modules or components are not all necessary parts. Or, in order to implement the present invention, other more detailed known modules or components might also be included. It is possible that each module or component can be omitted or modified depending on different requirements; and it is also possible that other modules or components might be disposed between any two modules.

Figure 3:
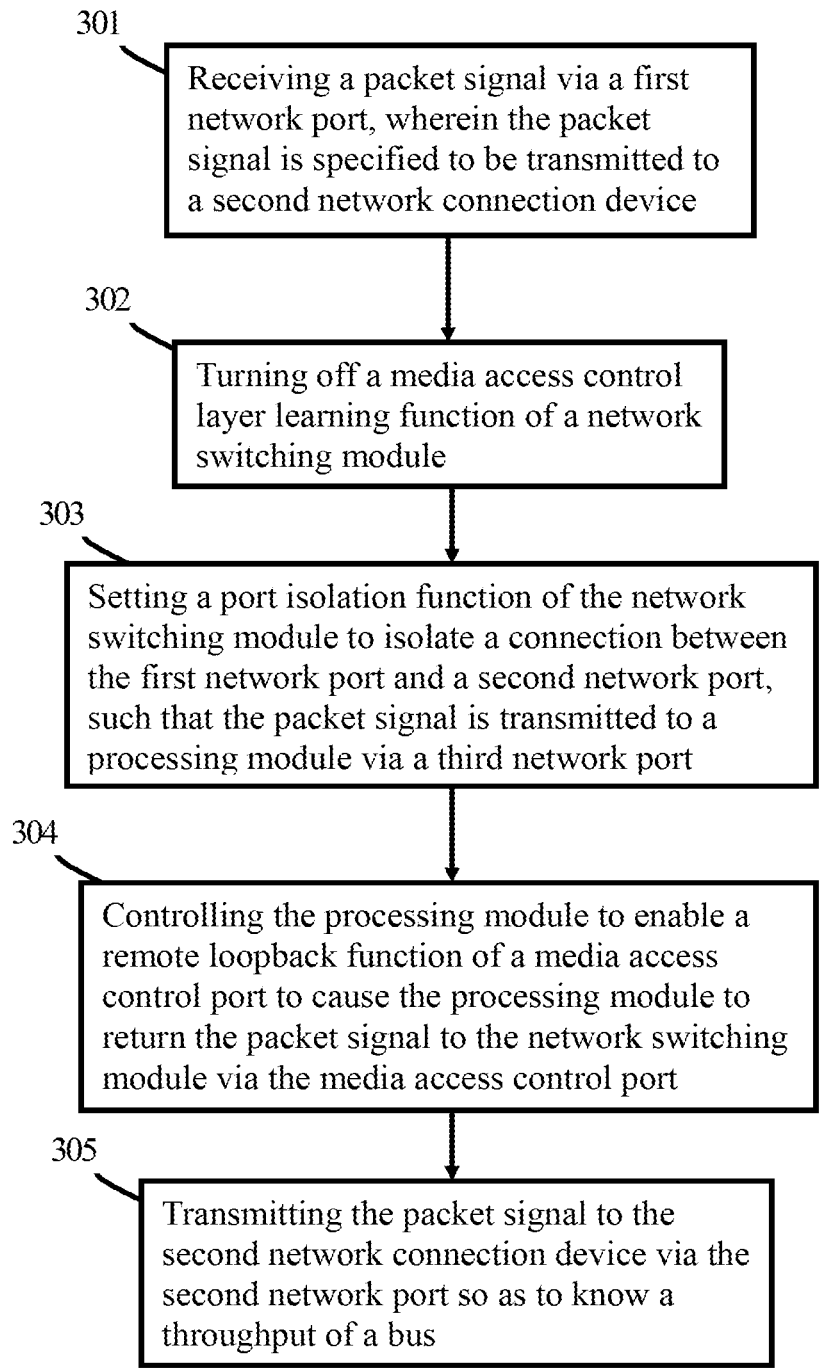
FIG. 3 illustrates a flowchart of a bus test method according to the present invention.

Next, please refer to FIG. 3, which illustrates a flowchart of a bus test method according to the present invention. Please note that the abovementioned bus test system 1 is used as an example of describing the bus test method of the present invention; however, the bus test method of the present invention is not limited to be used in exactly the same bus test system 1 as described above.

First, the method performs step 301: receiving a packet signal via a first network port, wherein the packet signal is specified to be transmitted to a second network connection device.

At first, the first network port 22a receives the packet signal from the first network connection device 51. This packet signal is specified to be transmitted to the second network connection device 52.

Then, the method performs step 302: turning off a media access control layer learning function of a network switching module.

Then, the network switching module 21 is used for turning off the MAC learning function, such that the packet signal would not be directly transmitted to the second network port 22b.

Meanwhile, the method performs step 303: setting a port isolation function of the network switching module to isolate a connection between the first network port and a second network port, such that the packet signal is transmitted to a processing module via a third network port.

Meanwhile, the network switching module 21 utilizes the port isolation function to isolate the connection between the first network port 22a and the second network port 22b. As such, the packet signal would be transmitted to the remaining third network port 22c, and further transmitted to the processing module 31 of the network processing device 30 via the bus 40 and the media access control port 32.

Next, the method performs step 304: controlling the processing module to enable a remote loopback function of a media access control port to cause the processing module to return the packet signal to the network switching module via the media access control port.

Next, the processing module 31 enables the remote loopback function of the media access control port 32, such that the packet signal is returned to the network switching module 21 via its original path.

Finally, the method performs step 305: transmitting the packet signal to the second network connection device via the second network port so as to acquire a throughput of a bus.

Finally, the network switching module 21 would transmit the packet signal to the first network connection device 51 via the first network port 22a and to the second network connection device 52 via the second network port 22b simultaneously. However, due to the internally specified address of the packet signal, the first network connection device 51 would not process this packet signal; whereas only the second network connection device 52 would carry out subsequent processing. After the second network connection device 52 receives the packet signal, the throughput of the bus 40 can be obtained accordingly.

Please note that the bus test method of the present invention is not limited to the above step orders. The execution order of the abovementioned steps can be altered as long as the object of the present invention can be achieved. For example, the object of the present invention can also be achieved if the method firstly turns off the MAC learning function, next sets the port isolation function and enables the remote loopback function, and then transmits the packet signal.

As a result, the present invention can test the throughput of the bus without utilizing WiFi, therefore the complexity of the test process can be reduced, and the test would not be limited by the bandwidth of WiFi.

Please note that embodiments disclosed herein are only preferred embodiments as examples for describing the present invention, in order to avoid redundant expressions, not all possible variations and combinations are described in details in this specification. However, those skilled in the art would understand the above modules or components are not all necessary parts. Or, in order to implement the present invention, other more detailed known modules or components might also be included. It is possible that each module or component can be omitted or modified depending on different requirements; and it is also possible that other modules or components might be disposed between any two modules. Although the present invention has been explained in relation to its preferred embodiments, it is to be under-

What is claimed is:

1. A bus test method, used for testing a bus of a network bridging device, the network bridging device comprising a network processing device and a media access control layer, wherein the network processing device comprises a processing module and a media access control port, and the media access control layer comprises a network switching module, a first network port, a second network port and a third network port, where the first network port is connected to a first network connection device, the second network port is connected to a second network connection device, and the third network port is connected to the media access control port via the bus; the method comprising the following steps:
   receiving a packet signal via the first network port, wherein the packet signal is specified to be transmitted to the second network connection device;
   turning off a media access control layer learning function of the network switching module to cause the packet signal to be transmitted to the second network port and the third network port at the same time;
   setting a port isolation function of the network switching module to isolate a connection between the first network port and the second network port to cause the packet signal not to be transmitted from the first network port to the second network port directly, such that the packet signal is transmitted to the processing module via the third network port;
   controlling the processing module to enable a remote loopback function of the media access control port to cause the processing module to return the packet signal to the network switching module via the media access control port; and
   transmitting the packet signal to the second network connection device via the second network port so as to acquire a throughput of the bus by the second network connection device.

2. The bus test method as claimed in claim 1, wherein the bus is a Reduced Gigabit Media Independent Interface (RGMII) bus.

3. The bus test method as claimed in claim 1 further comprising a step of utilizing an Ethernet cable to connect the first network port and the second network port to the first network connection device and the second network connection device.

4. A network bridging device, connected to a first network connection device and a second network connection device, the network bridging device comprising:
   a media access control layer, comprising:
      a first network port, connected to the first network connection device for receiving a packet signal, wherein the packet signal is specified to be transmitted to the second network connection device;
      a second network port, connected to the second network connection device;
      a third network port; and
      a network switching module, connected to the first network port, the second network port and the third network port, and used for turning off a media access control layer learning function to cause the packet signal to be transmitted to the second network port and the third network port at the same time, and setting a port isolation function, so as to isolate a connection between the first network port and the second network port to cause the packet signal not to be transmitted from the first network port to the second network port directly, such that the packet signal is transmitted to the third network port; and
   a network processing device, comprising:
      a media access control port, connected to the third network port via a bus for receiving the packet signal; and
      a processing module, connected to the media access control port, and used for enabling a remote loopback function of the media access control port to cause the processing module to return the packet signal to the network switching module via the media access control port, such that the packet signal is transmitted to the second network connection device via the second network port so as to acquire a throughput of the bus.

5. The network bridging device as claimed in claim 4, wherein the bus is a Reduced Gigabit Media Independent Interface (RGMII) bus.

6. The network bridging device as claimed in claim 4, wherein the first network port and the second network port are connected to the first network connection device and the second network connection device via an Ethernet cable.

7. A bus test system, comprising:
   a first network connection device;
   a second network connection device; and
   a network bridging device, connected to the first network connection device and the second network connection device, the network bridging device comprising:
      a media access control layer, comprising:
         a first network port, connected to the first network connection device for receiving a packet signal, wherein the packet signal is specified to be transmitted to the second network connection device;
         a second network port, connected to the second network connection device;
         a third network port; and
         a network switching module, connected to the first network port, the second network port and the third network port, and used for turning off a media access control layer learning function to cause the packet signal to be transmitted to the second network port and the third network port at the same time, and setting a port isolation function, so as to isolate a connection between the first network port and the second network port to cause the packet signal not to be transmitted from the first network port to the second network port directly, such that the packet signal is transmitted to the third network port; and
      a network processing device, comprising:
         a media access control port, connected to the third network port via a bus for receiving the packet signal; and
         a processing module, connected to the media access control port, and used for enabling a remote loopback function of the media access control port to cause the processing module to return the packet signal to the network switching module via the media access control port, such that the packet signal is transmitted to the second network connection device via the second network port so as to acquire a throughput of the bus.

8. The bus test system as claimed in claim 7, wherein the bus is a Reduced Gigabit Media Independent Interface (RGMII) bus.

9. The bus test system as claimed in claim 7, wherein the first network port and the second network port are connected to the first network connection device and the second network connection device via an Ethernet cable.

10. The bus test system as claimed in claim 7, wherein the first network connection device and the second network connection device are installed in different computer systems.

11. The bus test system as claimed in claim 7, wherein the first network connection device and the second network connection device are installed in the same computer system.

* * * * *